(12) United States Patent
Nakayama et al.

(10) Patent No.: US 9,062,578 B2
(45) Date of Patent: Jun. 23, 2015

(54) ENGINE

(71) Applicant: YAMAHA HATSUDOKI KABUSHIKI KAISHA, Iwata-shi, Shizuoka (JP)

(72) Inventors: Koichi Nakayama, Shizuoka (JP); Naoki Kinomoto, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 13/889,428

(22) Filed: May 8, 2013

(65) Prior Publication Data

US 2014/0041371 A1 Feb. 13, 2014

(30) Foreign Application Priority Data

Aug. 7, 2012 (JP) ................. 2012-175112

(51) Int. Cl.
| | |
|---|---|
| *F01N 3/00* | (2006.01) |
| *F01N 3/02* | (2006.01) |
| *F01N 3/10* | (2006.01) |
| *F01N 3/20* | (2006.01) |
| *F01N 3/04* | (2006.01) |
| *F01P 3/20* | (2006.01) |
| *F01M 5/00* | (2006.01) |
| *F01P 3/00* | (2006.01) |

(52) U.S. Cl.
CPC ............. *F01N 3/046* (2013.01); *F01N 3/2046* (2013.01); *F01N 2560/025* (2013.01); *F01N 2560/14* (2013.01); *F01N 2560/20* (2013.01); *F01N 2590/021* (2013.01); *F01N 2590/022* (2013.01); *F01P 3/202* (2013.01); *F01P 2003/006* (2013.01); *F01M 5/001* (2013.01); *Y02T 10/26* (2013.01)

(58) Field of Classification Search
USPC .................................... 60/274, 286, 295, 299
See application file for complete search history.

(56) References Cited

U.S. PATENT DOCUMENTS

| | | | | |
|---|---|---|---|---|
| 5,232,387 | A | * | 8/1993 | Sumigawa .................. 440/89 D |
| 5,921,829 | A | * | 7/1999 | Iwata .......................... 440/88 R |
| 2008/0070169 | A1 | * | 3/2008 | Ingalls et al. ..................... 431/9 |
| 2011/0126513 | A1 | * | 6/2011 | Lee et al. .......................... 60/274 |
| 2012/0180456 | A1 | * | 7/2012 | Yamada et al. .................. 60/274 |

FOREIGN PATENT DOCUMENTS

JP 09-309497 A 12/1997

* cited by examiner

*Primary Examiner* — Audrey K Bradley
*Assistant Examiner* — Dapinder Singh
(74) *Attorney, Agent, or Firm* — Keating & Bennett, LLP

(57) ABSTRACT

An engine includes an engine body and an exhaust pipe. The engine body includes a combustion chamber and an oil passage in which lubricating oil flows. The exhaust pipe includes an exhaust passage and an oil jacket. The exhaust passage is linked to the combustion chamber. The oil jacket is linked to the oil passage.

13 Claims, 10 Drawing Sheets

ENGINE

BACKGROUND OF THE INVENTION

1. Field of the Invention

The present invention relates to an engine.

2. Description of the Related Art

The exhaust gas from an internal combustion engine can readily cause an exhaust pipe to heat to a high temperature. For this reason, a mechanism for cooling the exhaust pipe using cooling water is used. The outboard motor disclosed in Japanese Patent Laid-open No. 09-309497, for example, provides an engine and a heat exchanger. The engine includes a cooling water jacket for cooling the engine. The heat exchanger cools the heated cooling water circulating in the cooling water jacket. In this way, the starting performance of the engine can be improved more by cooling the engine indirectly than by cooling the engine directly. The heat exchanger cools the cooling water in the cooling water jacket by exchanging heat between the cooling water in the cooling water jacket and seawater from a periphery of the marine vessel. After the seawater cools the cooling water in the cooling water jacket at the heat exchanger, the seawater cools an exhaust system of the engine.

If the temperature of an exhaust pipe becomes too low this may impact the operation or performance of the engine. For example, in the outboard motor disclosed in Japanese Patent Laid-open No. 09-309497, the engine itself is indirectly cooled by the cooling water. However, the exhaust system is directly cooled by the seawater from the periphery of the marine vessel. Therefore, when the temperature of the seawater is low, the wall temperature of the exhaust pipe stays at an excessively low temperature. If the exhaust pipe stays at an excessively low temperature, condensation forms inside the exhaust pipe because water vapor in the exhausted gas that contacts with the inside surface of the exhaust pipe is rapidly cooled. When this happens, if a sensor or catalyst disposed in the exhaust pipe becomes moistened by the condensation, the performance of the sensor or the catalyst may deteriorate substantially. Moreover, if the temperature of the catalyst is not sufficiently high it may become difficult for the catalyst to be activated.

SUMMARY OF THE INVENTION

In order to overcome the problems described above, preferred embodiments of the present invention provide an engine that avoids the phenomenon of an exhaust pipe staying at an excessively low temperature.

An engine according to a first preferred embodiment of the present invention includes an engine body and an exhaust pipe. The engine body includes a combustion chamber and an oil passage through which lubricating oil flows. The exhaust pipe includes an exhaust gas passage and an oil jacket. The exhaust gas passage is linked to the combustion chamber. The oil jacket is linked to the oil passage.

In the engine according to the first preferred embodiment of the present invention, the exhaust pipe is cooled by lubricating oil of the engine body whose temperature is lower than the temperature of the engine body as the lubricating oil flows in the oil jacket of the exhaust pipe. This prevents melting of the exhaust pipe because the exhaust pipe is cooled. The oil flowing in the oil jacket is lubricating oil for lubricating the engine. The oil is heated by repeatedly circulating inside the engine. Therefore, the oil will not be cooled to an excessively low temperature. Thereby, the wall temperature of the exhaust pipe stays at a predetermined temperature range preventing generation of condensation in the exhaust pipe.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
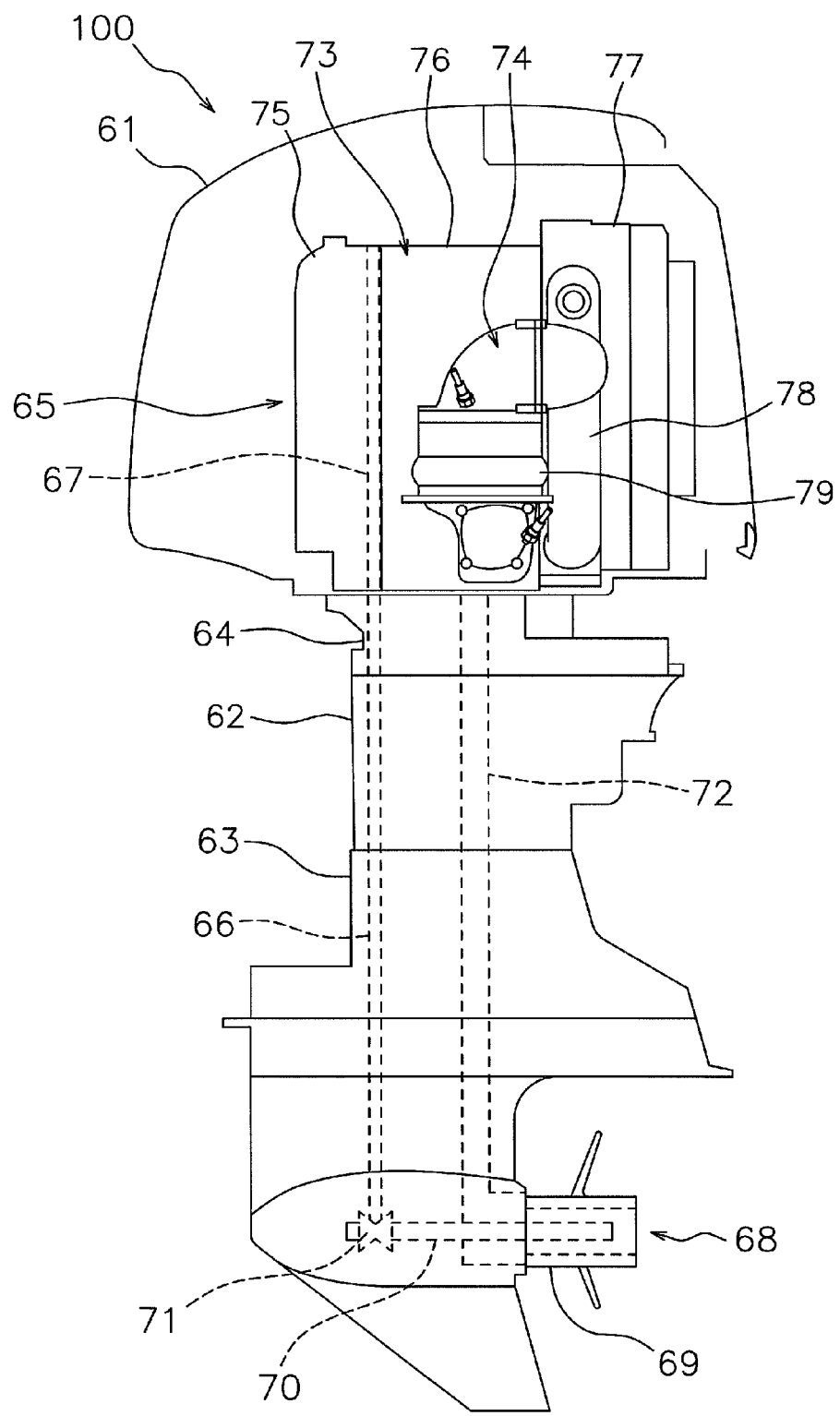
FIG. 1 is a side view showing the entire constitution of an outboard motor mounted with an engine according to a first preferred embodiment of the present invention.

An engine according to a first preferred embodiment of the present invention will now be described with reference to the drawings. FIG. 1 is a side view showing an outboard motor 100 mounted with an engine 65 according to the first preferred embodiment of the present invention. As shown in FIG. 1, the outboard motor 100 includes an engine cover 61, an upper casing 62, a lower casing 63, an exhaust guide portion 64, and the engine 65. To facilitate ease of understanding, in FIG. 1 the engine cover 61 is shown in a cross-sectional view.

The engine 65 is disposed inside the engine cover 61. As shown in FIG. 1, a drive shaft 66 is disposed within the upper casing 62 and the lower casing 63. The drive shaft 66 is disposed along the upward and downward direction within the upper casing 62 and the lower casing 63. The drive shaft 66 is linked to a crankshaft 67 of the engine 65. A propeller 68 is disposed at the lower portion of the lower casing 63. The propeller 68 is arranged below the engine 65. The propeller 68 includes a propeller boss 69. A propeller shaft 70 is disposed within the propeller boss 69. The propeller shaft 70 is disposed along the forward and backward direction. The propeller shaft 70 is linked to the lower portion of the drive shaft 66 via a bevel gear 71.

In the outboard motor 100, a drive force generated by the engine 65 is conveyed to the propeller 68 via the drive shaft 66 and the propeller shaft 70. This causes the propeller 68 to rotate in the forward direction or to rotate in the reverse direction. The result generates a propulsive force that causes the hull, to which the outboard motor 100 is attached, to travel forward or to travel in reverse.

The outboard motor 100 includes an exhaust gas passage 72. The exhaust gas passage 72 is disposed so as to extend through an exhaust guide portion 64, the upper casing 62, and the lower casing 63 to the propeller boss 69 of the propeller 68. Exhaust gas expelled from the engine 65 passes through the propeller boss 69 from the exhaust gas passage 72 and is expelled into the water.

The engine 65 includes an engine body 73 and an exhaust pipe 74. The engine body 73 includes a crank case 75, a cylinder block 76, and a cylinder head 77. The cylinder block 76 is arranged above the exhaust guide portion 64 and fixed to the exhaust guide portion 64. The cylinder block 76 includes a plurality of cylinders arranged in line in the upward and downward direction.

The cylinder head 77 is arranged to the rear of the cylinder block 76. The crank case 75 is arranged in front of the cylinder block 76. The crank case 75 holds the crankshaft 67. The crankshaft 67 extends in the upward and downward direction. The lower end portion of the crankshaft 67 is linked to the upper end portion of the above-mentioned drive shaft 66.

Figure 2:
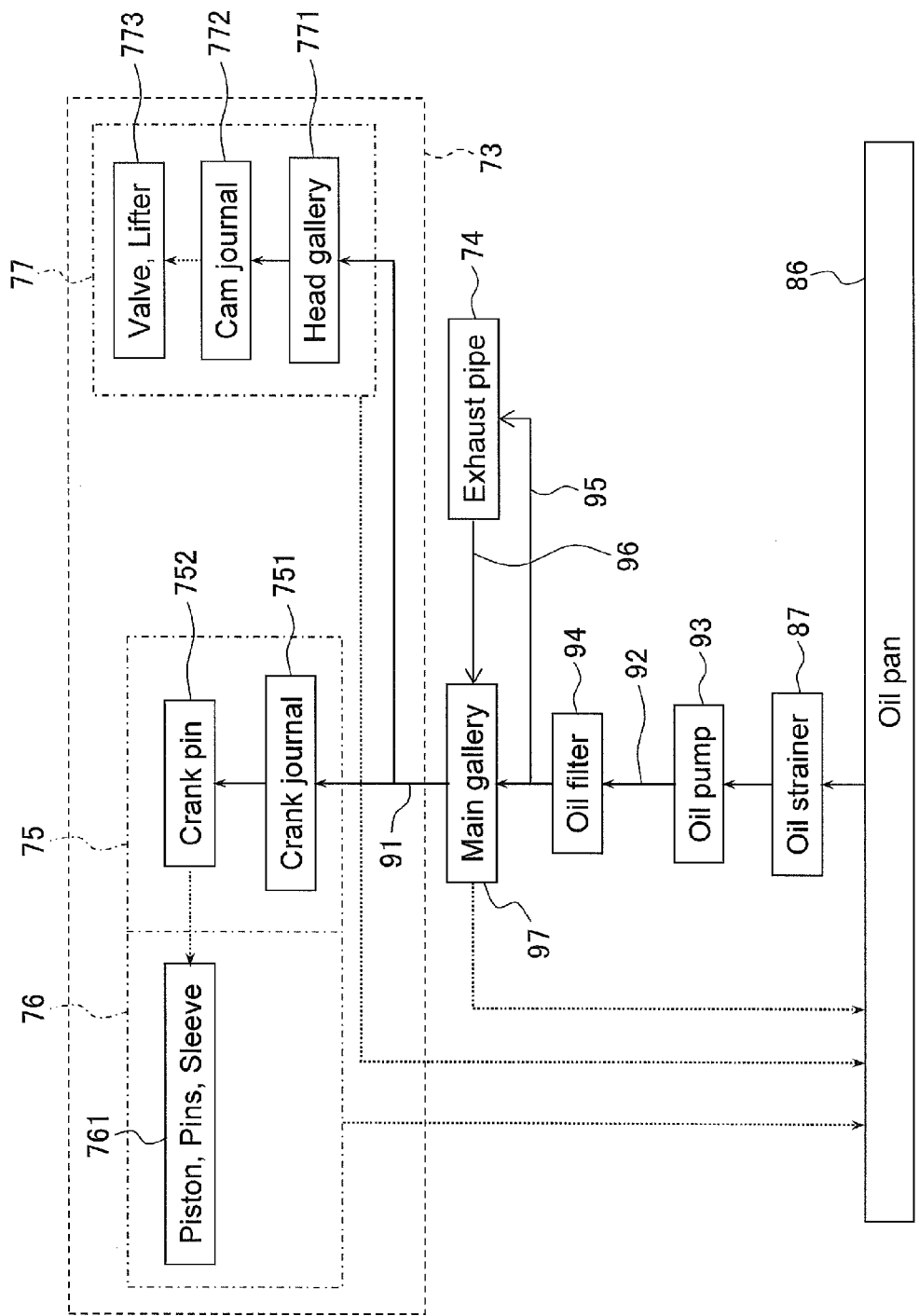
FIG. 2 is a schematic diagram showing the circulation system for lubricating oil in the engine of an outboard motor.

FIG. 2 is a schematic diagram showing the circulation system in the engine 65. As shown in FIG. 2 the engine body 73 includes an oil passage 91 through which lubricating oil flows. The oil passage 91 is disposed such that lubricating oil flows within the crank case 75, the cylinder block 76, and the cylinder head 77. The oil passage 91 is disposed such that the oil flow passes components such as the crank journal 751 and the crank pin 752 and the like in the crank case 75. The oil passage 91 is disposed such that the oil flow passes the components 761 such as the piston, pins, and sleeve and the like in the cylinder block 76. Further, the oil passage 91 is disposed such that oil flow passes components such as the head gallery 771, the cam journal 772, the valves and lifter 773 and the like in the cylinder head 77.

The engine 65 includes an oil pan 86. The oil pan 86 is attached to the bottom portion of the engine body 73. Lubricating oil drops down from the engine body 73 into the oil pan 86 and collects in the oil pan 86.

The engine 65 includes an oil circulation passage 92, an oil strainer 87, an oil pump 93, and an oil filter 94. The oil circulation passage 92 is connected to the oil passage 91 via a main gallery 97 and configured such that the lubricating oil flows as it is delivered to the oil passage 91 from the oil pan 86. The oil pump 93 is driven by the rotation of the crankshaft 67. The oil pump 93 pumps up oil inside the oil pan 86 and supplies the oil to the oil passage 91. The oil filter 94 filters the lubricating oil flowing in the oil circulation passage 92.

The engine 65 includes an oil branch passage 95 and an oil return passage 96. The oil branch passage 95 is connected downstream of the oil filter 94 to the oil circulation passage 92 and to an upstream end of an oil jacket 84 of the exhaust pipe 74, described below. The oil return passage 96 connects the downstream end of the oil jacket 84 of the exhaust pipe 74 to the main gallery 97.

The exhaust pipe 74 is preferably made of a metal such as, for example, aluminum or the like. The exhaust pipe 74 includes an exhaust manifold 78 and a catalyst unit 79. The exhaust manifold 78 is arranged to a side of the cylinder head 77. The exhaust manifold 78 is preferably integrally formed with the cylinder head 77. The catalyst unit 79 is attached to the exhaust manifold 78 and the cylinder block 76.

Figure 3:
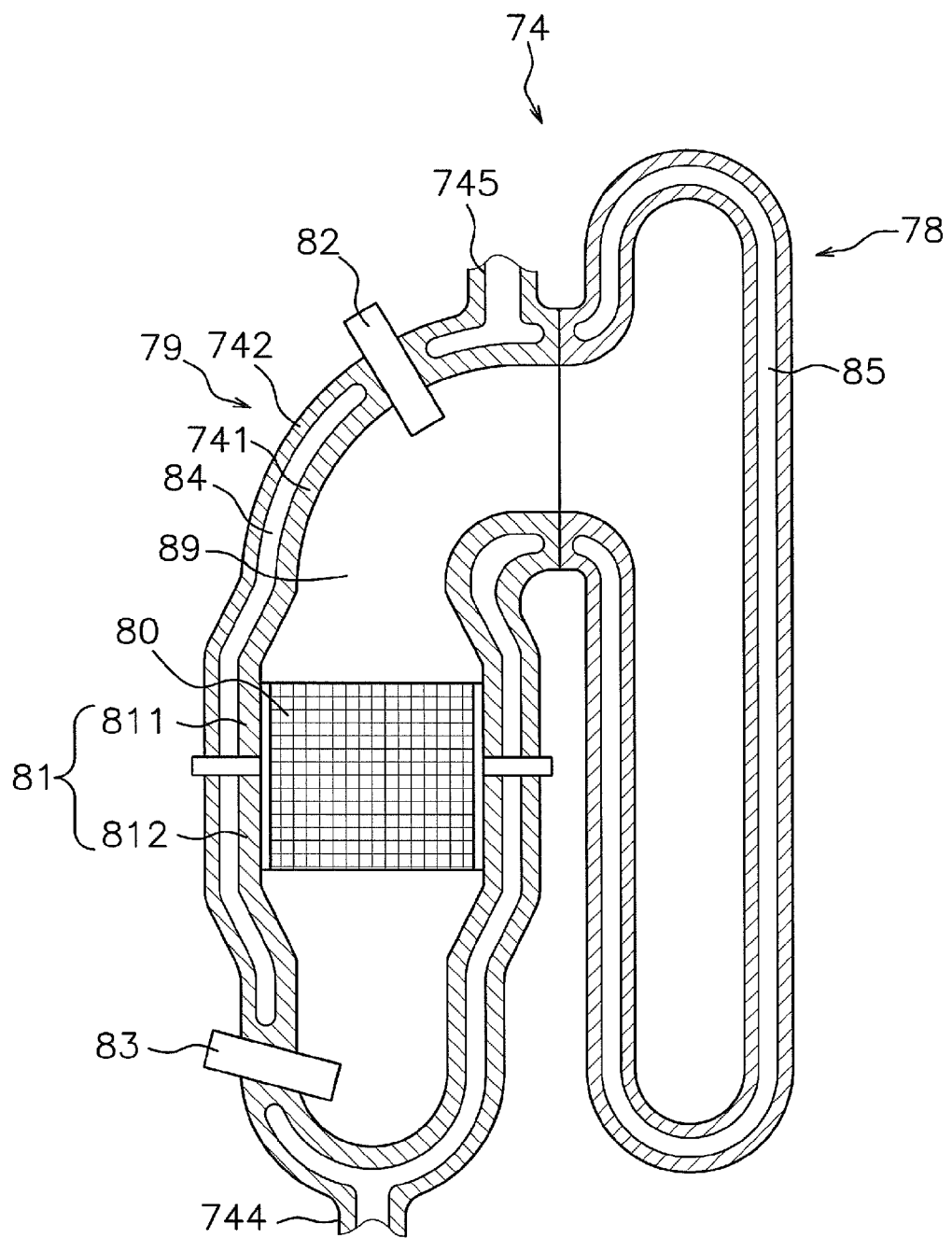
FIG. 3 is a schematic cross-sectional view showing the structure of an exhaust pipe of an engine according to the first preferred embodiment of the present invention.

FIG. 3 is a schematic cross-sectional view showing the structure of the exhaust pipe 74. As shown in FIG. 3, the exhaust pipe 74 includes an inner pipe 741 and an outer pipe 742. The inner pipe 741 is arranged inside of the outer pipe 742. The exhaust pipe 74 includes an exhaust gas passage 89, the oil jacket 84, and a water jacket 85. The exhaust gas passage 89 is arranged inside the inner pipe 741. The oil jacket 84 is preferably located in the catalyst unit 79. The water jacket 85 is preferably located in the exhaust manifold 78.

The oil jacket 84 is disposed between the outer pipe 742 and the inner pipe 741. The exhaust gas passage 89 is linked to a combustion chamber. Exhaust gas from the engine body 73 passes through the exhaust gas passage 89 and the exhaust gas passage 72 as it is sent outside the outboard motor 100. The oil jacket 84 is linked with the oil passage 91 via the oil branch passage 95.

The catalyst unit 79 includes a catalyst 80 and a catalyst housing pipe 81. The catalyst 80 is arranged inside the catalyst housing pipe 81. The catalyst housing pipe 81 accommodates the catalyst 80. Exhaust gas from the engine body 73 is cleaned as it passes through the catalyst 80 of the catalyst housing pipe 81. The catalyst housing pipe 81 is connected to the exhaust gas passage 72. The catalyst housing pipe 81 includes a first tubular member 811 and a second tubular member 812. The second tubular member 812 is disposed downstream of the first tubular member 811. The second tubular member 812 is preferably disposed below the first tubular member 811. A first oxygen sensor 82 is attached to the first tubular member 811. A second oxygen sensor 83 is attached to the second tubular member 812.

The exhaust pipe 74 includes a first oil port 744 and a second oil port 745. The first oil port 744 is disposed in the exhaust pipe 74 in a portion downstream from the catalyst 80 in the direction of the flow of exhaust gas. The second oil port 745 is disposed in the exhaust pipe 74 in a portion upstream from the catalyst 80 in the direction of the flow of exhaust gas. Basically, the first oil port 744 is located in the second tubular member 812, and the second oil port 745 is located in the first tubular member 811. The first oil port 744 is connected to the oil branch passage 95. The second oil port 745 is connected to the oil return passage 96.

As shown in FIG. 2, in the engine 65 of the present preferred embodiment, lubricating oil flows from the oil pan 86 into the oil circulation passage 92 and in succession flows through the oil strainer 87, the oil pump 93, the oil filter 94, the main gallery 97, and the oil passage 91, and returns to the oil pan 86. Further, a portion of the lubricating oil flows from a downstream side of the oil filter 94 in the oil circulation passage 92, passes through the oil branch passage 95 and flows to the oil jacket 84 of the exhaust pipe 74. As shown in FIG. 3, the lubricating oil enters the oil jacket 84 of the exhaust pipe 74 from the first oil port 744, passes through the catalyst housing pipe 81 and is discharged from the second oil port 745. In this manner, the catalyst housing pipe 81 is cooled by the lubricating oil in the oil jacket 84. The lubricating oil flows from the second oil port 745 along the oil return passage 96 and merges with the flow in the main gallery 97.

Cooling water is taken in from outside of the outboard motor 100 by a water pump not shown in the drawings, and is supplied to the water jacket 85. The cooling water passes through the water jacket 85 in the exhaust manifold 78. The exhaust manifold 78 is cooled by the cooling water in this manner.

In the engine 65 according to the first preferred embodiment of the present invention, the catalyst housing pipe 81 is cooled by lubricating oil of the engine body 73 flowing through the oil jacket 84. This prevents the catalyst housing pipe 81 from staying at an excessively low temperature. Note especially that because portions located at the periphery of the catalyst 80 and to the upstream side of the catalyst 80 in the catalyst housing pipe 81 are prevented from staying at an excessively low temperature, deterioration in the reaction efficiency of the catalyst 80 can be prevented. Further, because portions located to the upstream side from portions in which the first oxygen sensor 82 and the second oxygen sensor 83 are arranged in the catalyst housing pipe 81, as well as portions around the periphery of the first oxygen sensor 82 and the second oxygen sensor 83, are prevented from staying at an excessively low temperature, adverse effects from condensation are prevented from affecting the first oxygen sensor 82 and the second oxygen sensor 83.

Figure 4:
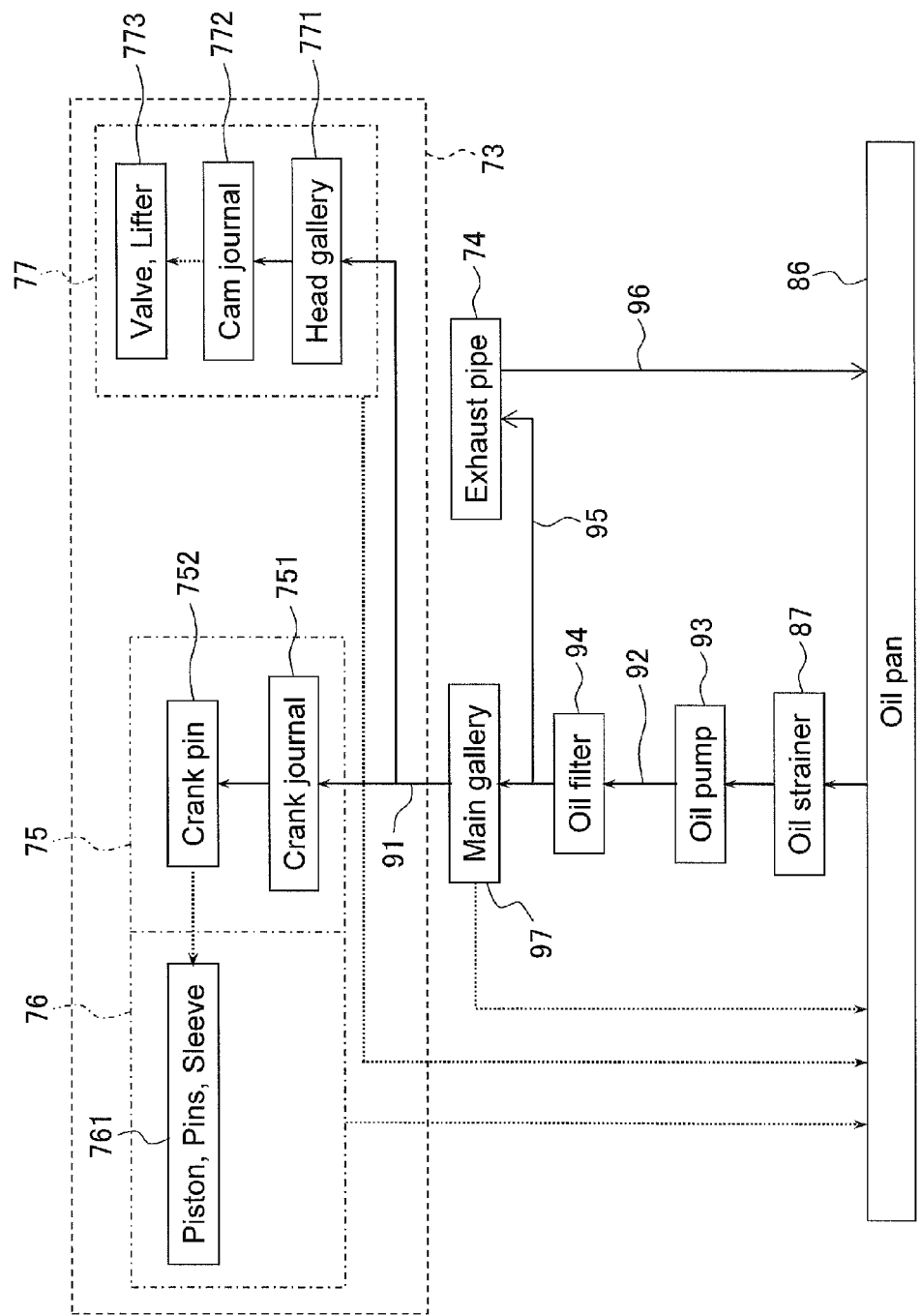
FIG. 4 is a schematic diagram showing the circulation system for lubricating oil in the engine of an outboard motor according to a second preferred embodiment of the present invention.

FIG. 4 is a schematic diagram showing a circulation system for lubricating oil in the engine of an outboard motor according to a second preferred embodiment of the present invention. In the engine of the outboard motor according to the second preferred embodiment, the oil return passage 96 connects the downstream end of the oil jacket 84 of the exhaust pipe 74 with the oil pan 86. Accordingly, lubricating oil that passes inside the oil jacket 84 and cools the exhaust pipe 74 returns from the second oil port 745 to the oil pan 86 via the oil return passage 96. Other configurations of the engine of the second preferred embodiment are preferably the same as the configurations in the engine 65 of the first preferred embodiment.

Figure 5:
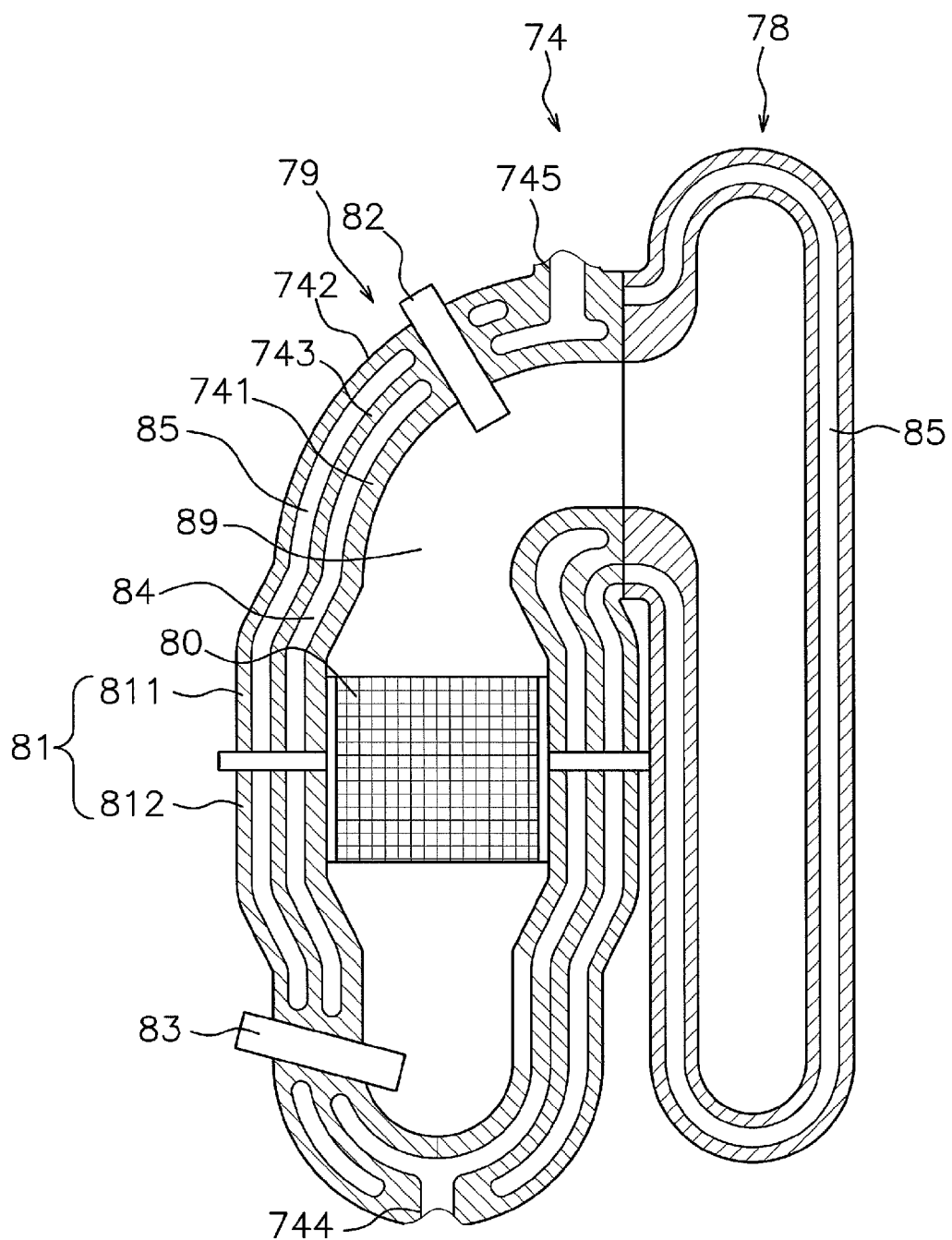
FIG. 5 is a schematic cross-sectional view showing the structure of the exhaust pipe of an engine according to a third preferred embodiment of the present invention.

FIG. 5 is a schematic cross-sectional view showing the exhaust pipe 74 of the engine according to a third preferred embodiment of the present invention. The exhaust pipe 74 includes the inner pipe 741 and the outer pipe 742 and a middle pipe 743. The inner pipe 741 is positioned at an innermost side among the inner pipe 741, the outer pipe 742, and the middle pipe 743. The outer pipe 742 is positioned at an outermost side among the inner pipe 741, the outer pipe 742, and the middle pipe 743. The middle pipe 743 is positioned between the outer pipe 742 and the inner pipe 741. The exhaust pipe 74 includes the exhaust gas passage 89, the oil jacket 84, and the water jacket 85. The exhaust gas passage 89 is arranged inside the inner pipe 741. The oil jacket 84 is arranged between the middle pipe 743 and the inner pipe 741. The water jacket 85 is arranged between the outer pipe 742 and the middle pipe 743.

The oil jacket 84 is arranged in the catalyst housing pipe 81. The water jacket 85 is arranged in both the exhaust manifold 78 and the catalyst housing pipe 81. The water jacket 85 is arranged around the oil jacket 84 in the catalyst housing pipe 81. In the same manner as the first preferred embodiment, the exhaust pipe 74 includes a first oil port 744 and a second oil port 745.

In the engine according to the third preferred embodiment of the present invention, the lubricating oil inside the oil jacket 84 is cooled by the cooling water inside the water jacket 85. This prevents the lubricating oil from being heated to a high temperature so as to prevent a rise in the temperature of the exhaust pipe 74. Further, this prevents deterioration in the lubricating performance of the lubricating oil.

Figure 6:
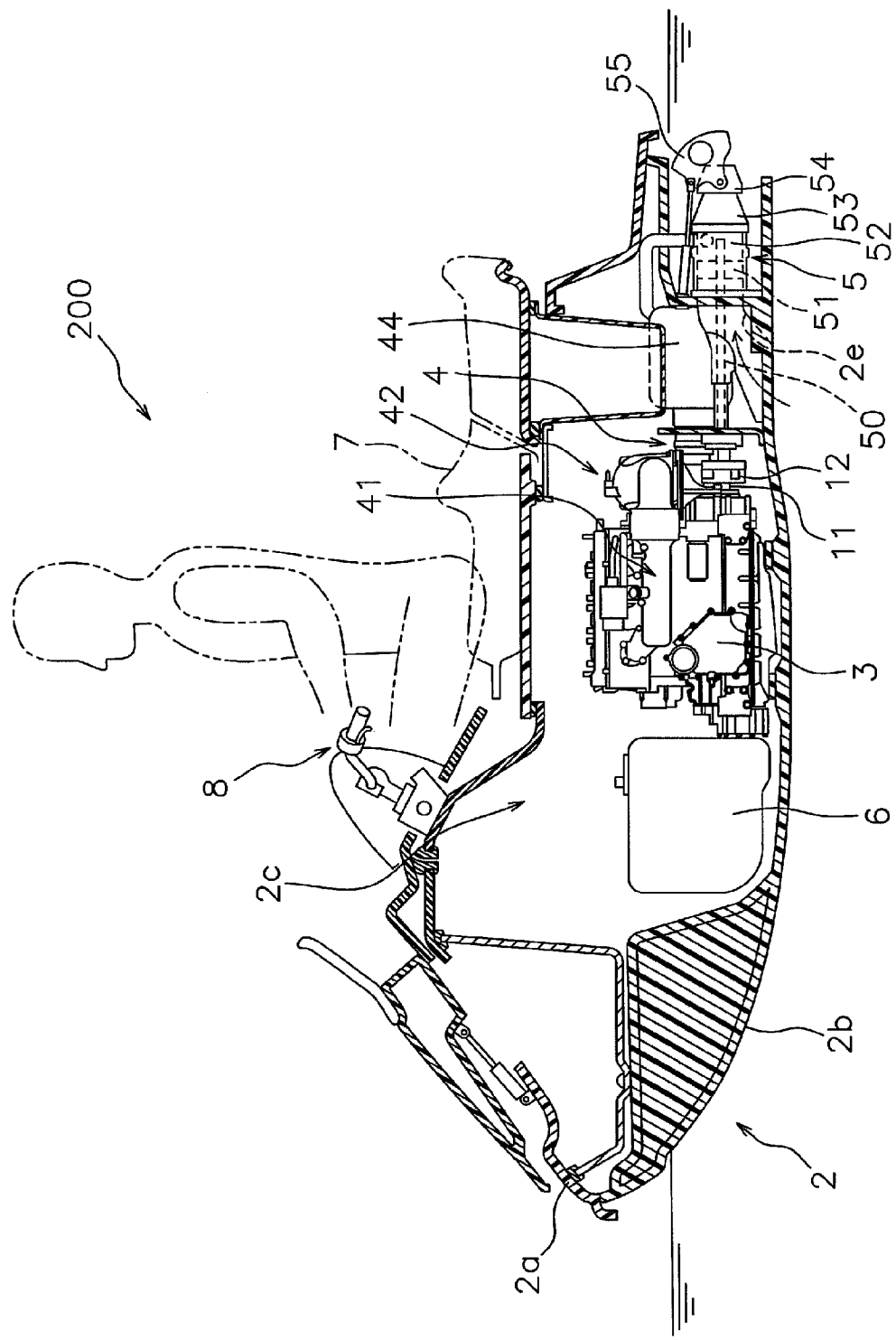
FIG. 6 is a cross-sectional drawing showing the whole constitution of a water jet propulsion watercraft mounted with an engine according to a fourth preferred embodiment of the present invention.

FIG. 6 is a cross-sectional drawing showing the entire constitution of a water jet propulsion watercraft 200 mounted with an engine according to a fourth preferred embodiment of the present invention. The water jet propulsion watercraft 200 is, for example, a personal watercraft (PWC). The water jet propulsion watercraft 200 includes a water craft body 2, an engine 3, and a jet propulsion unit 5. The water craft body 2 includes a deck 2a and a hull 2b. The engine 3 is housed inside the water craft body 2. The jet propulsion unit 5 is driven by the engine 3.

An engine room 2c is provided inside the water craft body 2. The engine room 2c houses the engine 3 and a fuel tank 6 and the like. A seat 7 is attached to the deck 2a. The seat 7 is arranged above the engine 3. A steering handlebar 84 for steering the water craft body 2 is arranged in front of the seat 7. Note that in the following description, the forward, reverse, left, and right directions, as well as directions such as inclinations and the like, refer to directions as they would be perceived by a rider sitting on the seat 7 as the water jet propulsion watercraft 200 floats on calm water.

The engine 3 preferably is, for example, an in-line four-cylinder four stroke engine. The engine 3 includes a crankshaft 11. The crankshaft 11 is arranged to extend in the forward and backward direction.

The jet propulsion unit 5 draws in and jets out water from around the water craft body 2. The jet propulsion unit 5 includes an impeller shaft 50, an impeller 51, an impeller housing 52, a nozzle 53, a deflector 54, and a reverse gate 55. The impeller shaft 50 is arranged to extend rearward from the engine room 2c. The front portion of the impeller shaft 50 is connected to the crankshaft 11 via a coupling 12. The rear portion of the impeller shaft 50 passes through a water suction portion 2e of the water craft body 2 and extends inside the impeller housing 52. The impeller housing 52 is connected to the rear portion of the water suction portion 2e. The nozzle 53 is arranged behind the impeller housing 52.

The impeller 51 is attached to the rear portion of the impeller shaft 50. The impeller 51 is arranged inside the impeller housing 52. The impeller 51 rotates together with the impeller shaft 50 drawing in water from the water suction portion 2e. The impeller 51 jets the water thus drawn in backward from the nozzle 53. The deflector 54 is arranged behind the nozzle 53. The deflector 54 is configured such that the direction of water jetted from the nozzle 53 can be diverted in the left and right directions. The reverse gate 55 is arranged behind the deflector 54. The reverse gate 55 is configured such that the direction of water jetted from the nozzle 53 and the deflector 54 can be diverted in the forward direction.

Figure 7:
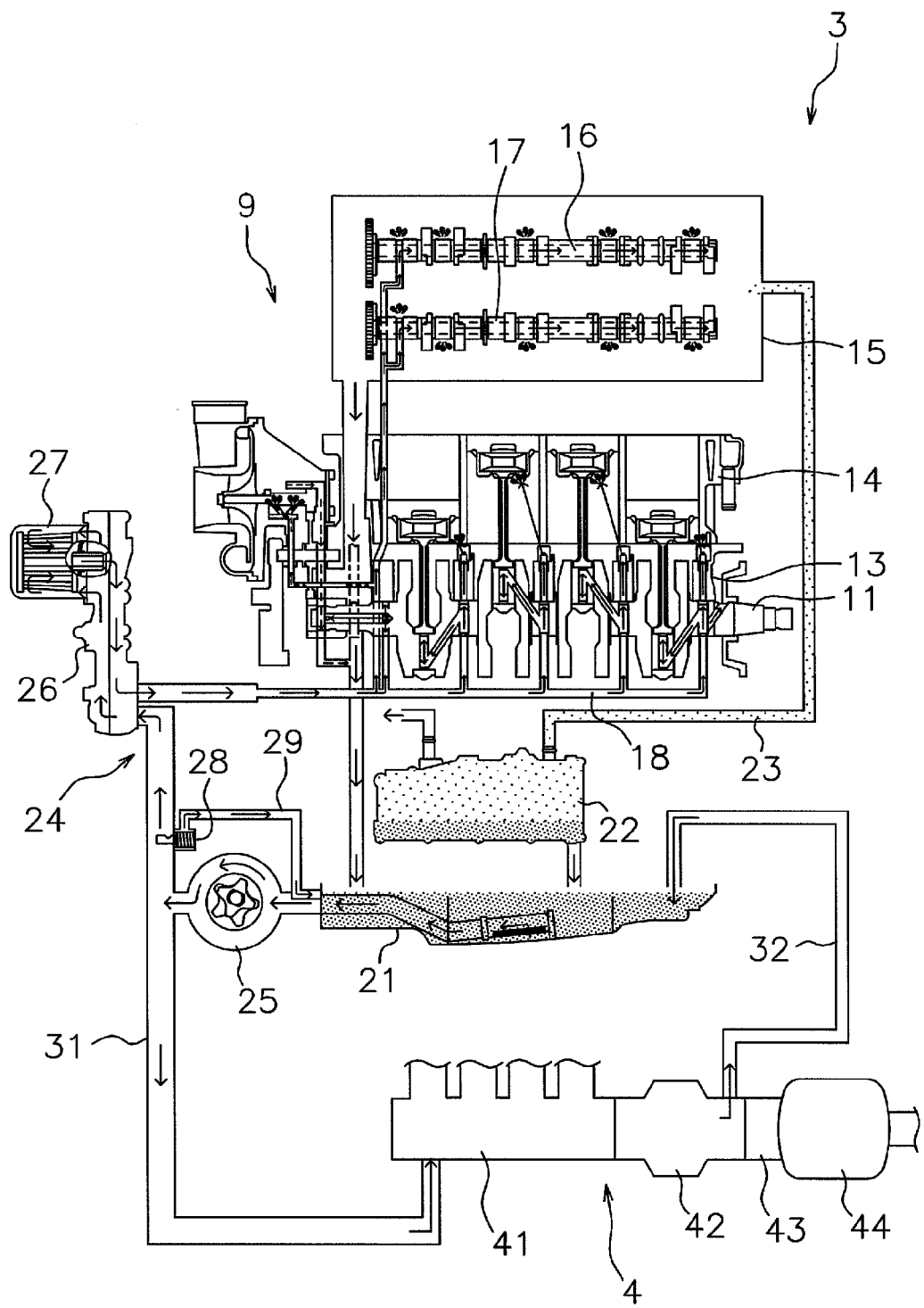
FIG. 7 is a schematic diagram showing the circulating system for lubricating oil in the engine according to the fourth preferred embodiment of the present invention.

FIG. 7 is a schematic diagram showing the circulation system for lubricating oil in the engine 3 and the configuration of the engine 3 in the water jet propulsion watercraft 200. The engine 3 includes an engine body 9 and an exhaust pipe 4. The exhaust pipe 4 directs exhaust gas from the engine body 9 to the outside of the water craft body 2.

The engine body 9 includes a crank case 13, a cylinder 14, and a cylinder head 15. The crank case 13 holds the above-mentioned crankshaft 11. The cylinder 14 is arranged above the crank case 13. The cylinder head 15 is arranged above the cylinder 14. A combustion chamber is provided in the cylinder head 15. Further, an intake camshaft 16 and an exhaust camshaft 17 are arranged in the cylinder head 15. An intake valve (not shown in the drawings) arranged in the combustion chamber opens and closes as the intake camshaft 16 is driven. An exhaust valve (not shown in the drawing) arranged in the combustion chamber opens and closes as the exhaust camshaft 17 is driven. The engine body 9 includes an oil passage 18 through which lubricating oil flows. The oil passage 18 is disposed such that lubricating oil flows in the crank case 13, the cylinder 14, and the cylinder head 15.

The engine 3 includes an oil pan 21. The oil pan 21 is attached to the bottom of the engine body 9. Lubricating oil drops down from the engine body 9 into the oil pan 21 and collects in the oil pan 21. The engine 3 includes an oil separator tank 22 and a separator passage 23. The oil separator tank 22 is connected to the cylinder head 15 via the separator passage 23. Blowby gas in the engine body 9 flows via the separator passage 23 to the oil separator tank 22. Lubricating oil within the blowby gas is separated from the blowby gas in the oil separator tank 22. The separated lubricating oil then flows to the oil pan 21.

The engine 3 includes an oil circulation passage 24, an oil pump 25, an oil cooler 26, and an oil filter 27. The oil circulation passage 24 is configured so as to facilitate the flow of lubricating oil delivered from the oil pan 21 to the oil passage 18. The oil pump 25 is driven by the rotation of the crankshaft 11. The oil pump 25 draws up oil that is inside the oil pan 21 and supplies this oil to the oil passage 18. The oil cooler 26 cools the lubricating oil that flows in the oil circulation passage 24. The oil filter 27 filters the lubricating oil that flows in the oil circulation passage 24. The oil filter 27 is attached to the oil cooler 26.

In the oil circulation passage 24, a relief passage 29 is connected downstream of the oil pump 25 via a relief valve 28. The relief passage 29 is connected to the oil pan 21. The relief valve 28 opens when the pressure of the lubricating oil inside the oil circulation passage 24 is greater than or equal to a predetermined relief pressure. When the relief valve 28 opens, a portion of the lubricating oil inside the oil circulation passage 24 flows to the oil pan 21 via the relief passage 29.

The engine 3 includes an oil branch passage 31 and an oil return passage 32. The oil branch passage 31 connects an upstream side of the oil filter 27 in the oil circulation passage 24 with an upstream end of an oil jacket 37 of the exhaust pipe 4, described below. In other words, the oil branch passage 31 connects the upstream side of the oil cooler 26 in the oil circulation passage 24 with the upstream end of the oil jacket 37 of the exhaust pipe 4, described below. The oil return passage 32 connects the downstream end of the oil jacket 37 of the exhaust pipe 4 with the oil pan 21.

Figure 8:
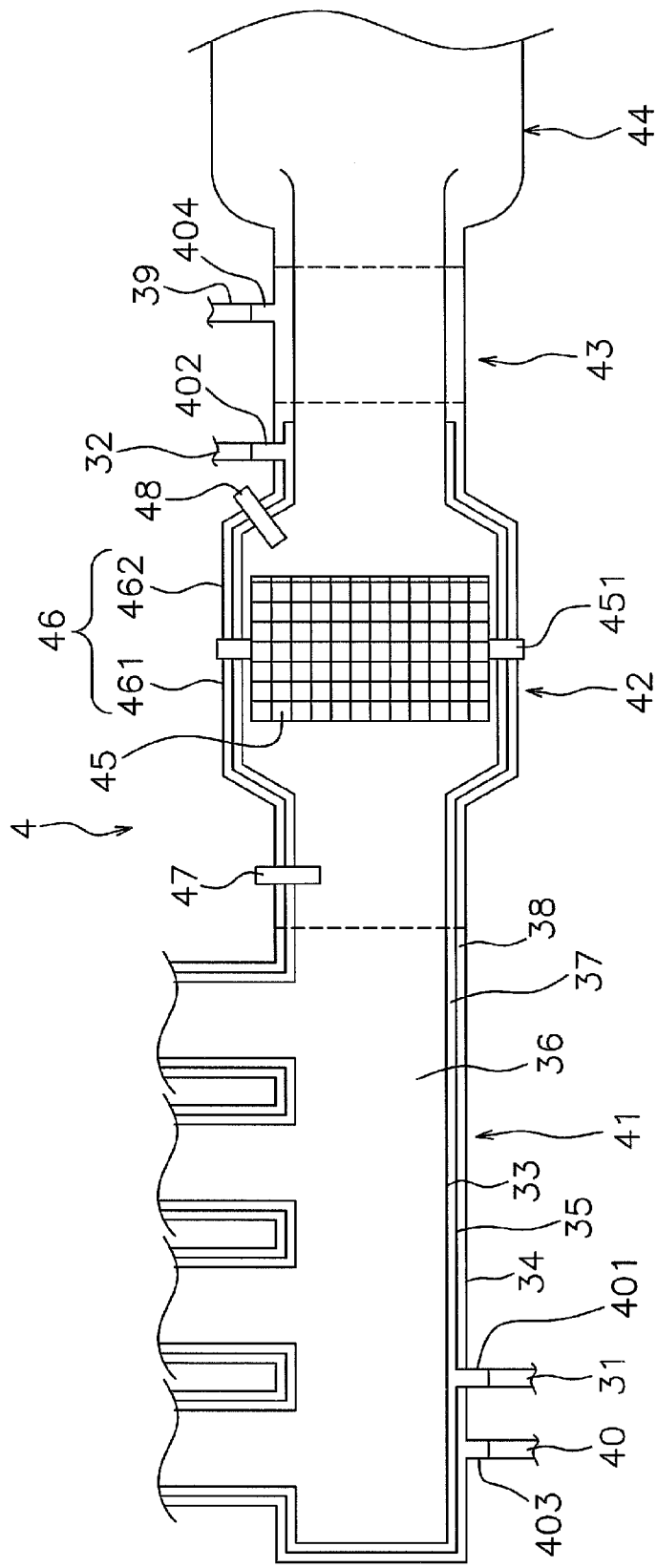
FIG. 8 is a schematic cross-sectional view showing the structure of the exhaust pipe of the engine according to the fourth preferred embodiment of the present invention.

The exhaust pipe 4 is preferably made of a metal such as, for example, aluminum or the like. FIG. 8 is a schematic cross-sectional view showing the structure of the exhaust pipe 4. As shown in FIG. 8, the exhaust pipe 4 includes an inner pipe 33, an outer pipe 34, and a middle pipe 35. The inner pipe 33 is positioned at an innermost side among the inner pipe 33, the outer pipe 34, and the middle pipe 35. The outer pipe 34 is positioned at an outermost side among the inner pipe 33, the outer pipe 34, and the middle pipe 35. The middle pipe 35 is positioned between the inner pipe 33 and the outer pipe 34. The exhaust pipe 4 includes an exhaust gas passage 36, the oil jacket 37, and a water jacket 38. The exhaust gas passage 36 is arranged inside the inner pipe 33. The oil jacket 37 is arranged between the inner pipe 33 and the middle pipe 35. A portion of the water jacket 38 is arranged between the inner pipe 35 and the outer pipe 34. That is, a portion of the water jacket 38 is arranged around the oil jacket 37. The exhaust gas passage 36 is linked to a combustion chamber. Exhaust gas from the engine body 9 passes through the exhaust gas passage 36 and is delivered outside the water craft body 2. The oil jacket 37 is linked with the oil passage 18 via the oil circulation passage 24. Cooling water such as seawater taken in from outside the water craft body 2 flows in the water jacket 38.

The exhaust pipe 4 includes an exhaust manifold 41, a catalyst unit 42, a connecting pipe 43, and a water lock 44. The exhaust manifold 41 is connected to a plurality of exhaust ports (not shown in the drawings) of the cylinder head 15. The catalyst unit 42 is arranged to the downstream side of the exhaust manifold 41 in the exhaust pipe 4. The catalyst unit 42 includes a catalyst 45 and a catalyst housing pipe 46. The catalyst 45 accelerates the reaction of components (e.g., HC, CO, NOx) contained in the exhaust gas. The catalyst 45 causes components in the exhaust gas (e.g. HC, CO, NOx) to react efficiently when a predetermined temperature (approximately 300° C., for example) is exceeded. A three-way catalyst, for example, can be used as the catalyst 45. The catalyst housing pipe 46 accommodates the catalyst 45. The catalyst 45 is arranged in the exhaust gas passage 36 inside the catalyst housing pipe 46. The catalyst housing pipe 46 includes a first pipe 461 and a second pipe 462 separate from each other. The second pipe 462 is arranged to the downstream side of the first pipe 461. A flange member 451 is attached to the catalyst 45. The catalyst 45 is fixed to the catalyst housing pipe 46 due to the flange member 451 being supported between the first pipe 461 and the second pipe 462.

The connecting pipe 43 connects the catalyst housing pipe 46 and the water lock 44. The water lock 44 preferably is in the shape of a tank. The water lock 44 is configured so as to minimize an influx of water toward the engine body 9 that enters from the outlet of the exhaust pipe 4. Exhaust gas from the engine body 9 passes through, in succession, the exhaust manifold 41, the catalyst unit 42, the connecting pipe 43, and the water lock 44 and is then discharged outside of the water craft body 2. Exhaust gas is cleaned by the catalyst 45 as it passes through the catalyst unit 42.

The engine 3 includes a first oxygen sensor 47 and a second oxygen sensor 48. The first oxygen sensor 47 and the second oxygen sensor 48 detect the concentration of oxygen in the exhaust gas. The first oxygen sensor 47 is arranged to the upstream side of the catalyst 45 in the exhaust gas passage 36. The second oxygen sensor 48 is arranged to the downstream side of the catalyst 45 in the exhaust gas passage 36.

The oil jacket 37 is arranged around the catalyst 45 and around locations upstream from the catalyst 45 in the exhaust gas passage 36. Basically, the oil jacket 37 is located in the exhaust manifold 41 and the catalyst housing pipe 46. In other words, the oil jacket 37 is arranged around the exhaust gas passage 36 in at least locations upstream from the first oxygen sensor 47 and the second oxygen sensor 48.

The water jacket 38 is more expansive than the oil jacket 37 in the exhaust pipe 4. Basically, the water jacket 38 is located in the exhaust manifold 41, the catalyst housing pipe 46, and the connecting pipe 43. The water jacket 38 is arranged between the outer pipe 34 and the middle pipe 35 in the exhaust manifold 41 and the catalyst housing pipe 46. The water jacket 38 is arranged between the inner pipe 33 and the outer pipe 34 in the connecting pipe 43.

The exhaust pipe 4 includes a first oil port 401 and a second oil port 402. The first oil port 401 is disposed in a portion to the upstream side of the catalyst 45 in the exhaust pipe 4. The second oil port 402 is disposed in a portion to the downstream side of the catalyst 45 in the exhaust pipe 4. Basically, the first oil port 401 is preferably located in the exhaust manifold 41. The second oil port is preferably located in the second pipe 462 of the catalyst unit 42. The first oil port 401 is connected to the oil branch passage 31. The second oil port 402 is connected to the oil return passage 32.

The exhaust pipe 4 includes a first water port 403 and a second water port 404. The first water port 403 is arranged in a portion to the upstream side of the catalyst 45 in the exhaust pipe 4. The second water port 404 is arranged in a portion to the downstream side of the catalyst 45 in the exhaust pipe 4. Basically, the first water port 403 is preferably located in the exhaust manifold 41. The second water port 404 is preferably located in the connecting pipe 43. The second water port 404 is connected to the jet propulsion unit 5 via a cooling water passage 39. Cooling water is drawn in from outside of the water craft body 2 by the jet propulsion unit 5, passes through the cooling water passage 39 and the second water port 404, and is supplied to the water jacket 38. The first water port 403 is connected to a cooling water passage 40. Cooling water passes through the first water port 403, is discharged from the water jacket 38 of the exhaust pipe 4, passes through the cooling water passage 40, and is supplied to other portions of the engine 3.

As shown in FIG. 7, in the engine 3 according to the present preferred embodiment of the present invention, the lubricating oil flows from the oil pan 21 through, successively, the oil circulation passage 24, the oil cooler 26, the oil filter 27, and the oil passage 18 and returns to the oil pan 21. Further, a portion of the lubricating oil flows from a portion to the upstream side of the oil cooler 26 in the oil circulation passage 24, passes through the oil branch passage 31, and flows to the oil jacket 37 of the exhaust pipe 4. As shown in FIG. 8, the lubricating oil enters the oil jacket 37 of the exhaust pipe 4 from the first oil port 401, passes through the exhaust manifold 41 and the catalyst housing pipe 46, and is discharged from the second oil port 402. In this way, the exhaust pipe 4 is cooled by the lubricating oil in the oil jacket 37. The lubricating oil flows from the second oil port 402 through the oil return passage 32 and returns to the oil pan 21.

In the engine 3 according to the present preferred embodiment, the exhaust pipe 4 is cooled by the lubricating oil in the engine body 9 flowing through the oil jacket 37. This prevents the exhaust pipe 4 from staying at an excessively low temperature. Note especially that because portions located to the upstream side of the catalyst 45 in the exhaust pipe 4 are prevented from staying at an excessively low temperature, deterioration in the reaction efficiency of the catalyst 45 can be prevented. Further, because the exhaust gas pipe 4, and portions located to the upstream side of portions in which the first oxygen sensor 47 and the second oxygen sensor 48 are arranged, are prevented from staying at an excessively low temperature, adverse effects from condensation are prevented from affecting the first oxygen sensor 47 and the second oxygen sensor 48.

Moreover, the lubricating oil in the oil jacket 37 is cooled by cooling water inside the water jacket 38. This prevents the lubricating oil from being heated to a high temperature so as to prevent a rise in the temperature of the exhaust pipe 4. Further, this prevents deterioration in the lubricating performance of the lubricating oil.

Figure 9:
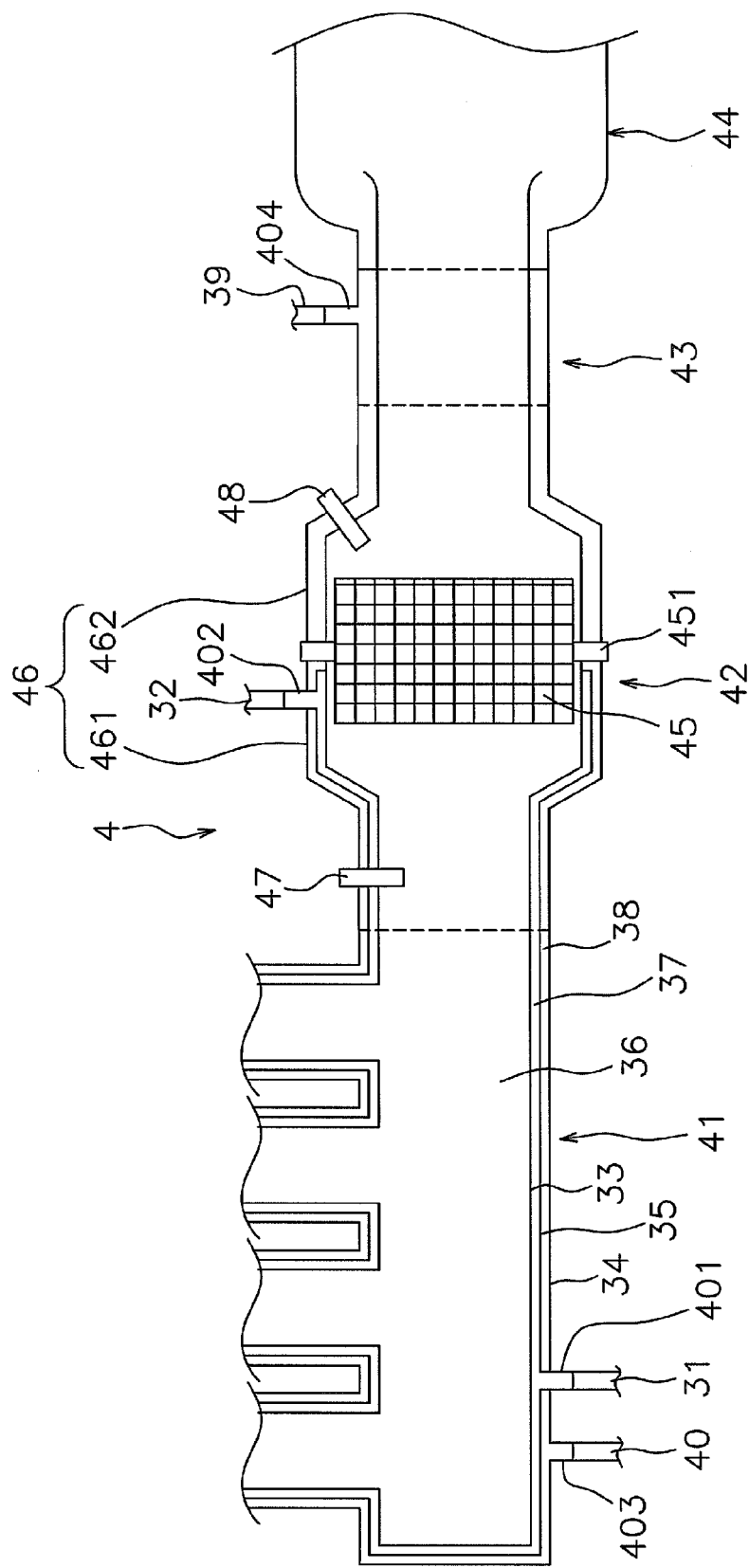
FIG. 9 is a schematic cross-sectional view showing the structure of the exhaust pipe of an engine according to a fifth preferred embodiment of the present invention.

FIG. 9 is a schematic cross-sectional view of the exhaust pipe 4 of an engine according to the fifth preferred embodiment of the present invention. In the exhaust pipe 4 of the engine according to the fifth preferred embodiment, the oil jacket 37 is arranged in only the exhaust manifold 41 and the first pipe 461 of the catalyst unit 42. The oil jacket 37 is not provided in the second pipe 462 and the connecting pipe 43, and the water jacket 38 is provided in the second pipe 462 and between the inner pipe 33 and the outer pipe 34 of the connecting pipe 43. The first oil port 401 is located in the exhaust manifold 41. The second oil port 402 is located in the first pipe 461. Other configurations of the engine according to the fifth preferred embodiment are preferably the same as configurations of the engine 3 according to the fourth preferred embodiment of the present invention. In the engine according to the fifth preferred embodiment, the catalyst 45 can be cooled to a lower temperature.

Figure 10:
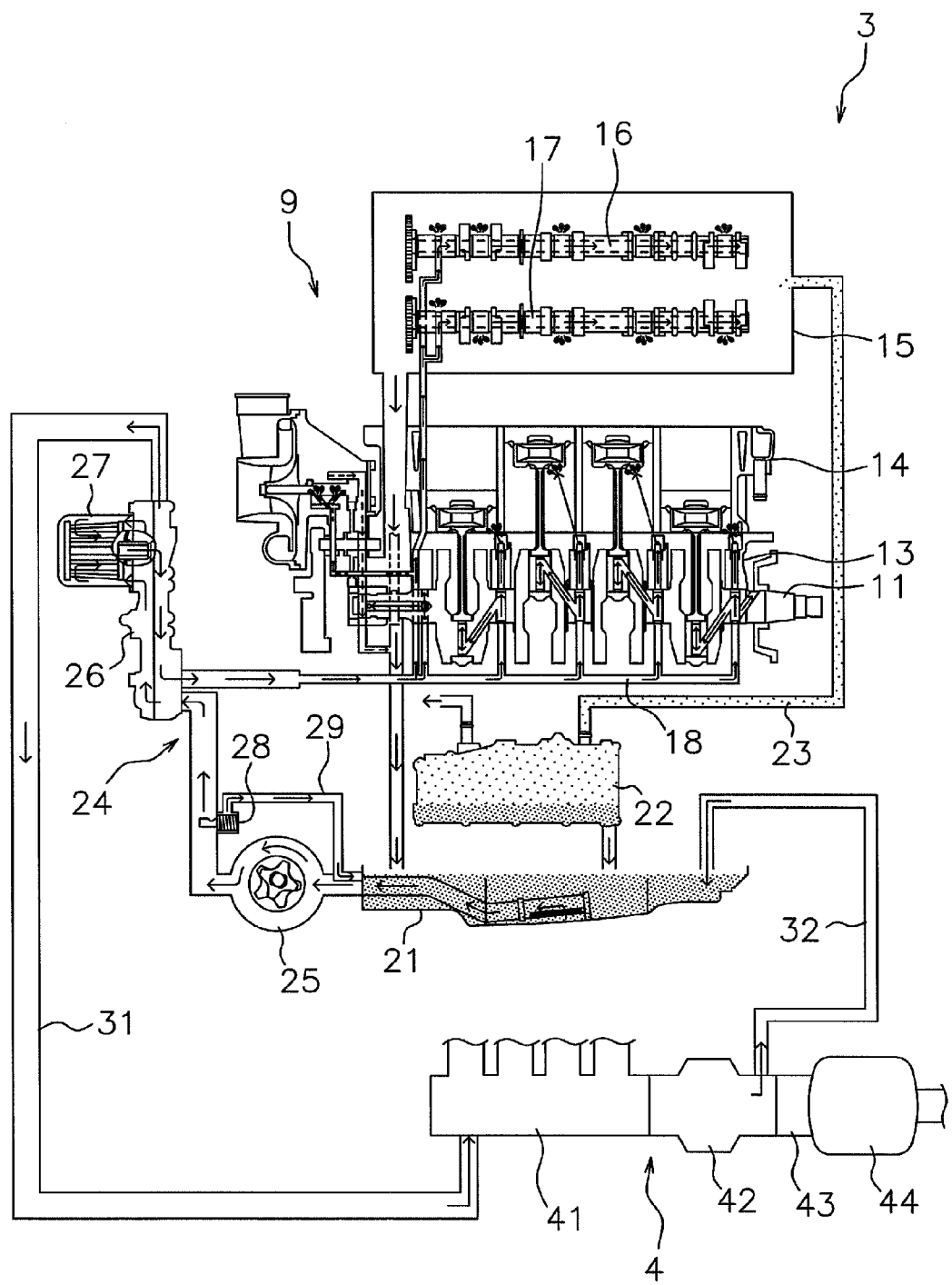
FIG. 10 is a schematic diagram showing the circulation system for lubricating oil in an engine according to a sixth preferred embodiment of the present invention.

FIG. 10 is a schematic diagram showing an engine according to the sixth preferred embodiment of the present invention and the lubricating oil circulation system therefore. In the engine according to the sixth preferred embodiment, the oil branch passage 31 is connected to the downstream side of the oil filter 27 in the oil circulation passage 24. The oil branch passage 31 is connected to the oil cooler 26. Other configurations of the engine according to the sixth preferred embodiment are preferably the same as configurations of the engine 3 according to the fourth preferred embodiment of the present invention. In the engine according to the sixth preferred embodiment, lubricating oil at a lower temperature can be supplied to the exhaust pipe 4.

Although preferred embodiments of the present invention have been described above, the present invention is not limited to the above-described preferred embodiments. It is therefore understood that numerous modifications and variations can be devised without departing from the scope of the present invention.

In the above described preferred embodiments, the engine is preferably mounted in a water jet propulsion watercraft or an outboard motor, for example. However, the present invention is not restricted to an engine mounted in a water vehicle. It is suitable for the present invention to be applied to an engine mounted in other vehicles such as an ATV (All Terrain Vehicle) or a snowmobile or the like.

The connecting end of the oil branch passage is not limited to that disclosed in the above preferred embodiments. For example, it is suitable for the oil branch passage to be connected downstream of the oil cooler. The connecting end of the oil return passage is not limited to being connected to the oil pan. For example, it is also suitable for the oil return passage to be connected downstream of a portion connected to the oil branch passage in the oil circulation passage.

In the above-described preferred embodiments, the lubricating oil preferably passes through the first oil port and enters into the oil jacket, and passes through the second oil port and is discharged from the oil jacket. However, it is also suitable for the engine to have a contrary configuration in which the lubricating oil passes through the second oil port and enters into the oil jacket, and passes through the first oil port and is discharged from the oil jacket.

In the above-described preferred embodiments, the cooling water preferably passes through the second water port and enters into the water jacket, and passes through the first water port and is discharged from the water jacket. However, it is also suitable for the engine to have a contrary configuration in which the cooling water passes through the first water port and enters into the water jacket, and passes through the second water port and is discharged from the water jacket.

The locations of the first oil port and the second oil port are not restricted to those disclosed in the above described preferred embodiments. The locations of the first water port and the second water port are not restricted to those disclosed in the above described preferred embodiments.

In the above-described preferred embodiments, the water jacket in the exhaust pipe is preferably arranged around the oil jacket. However, it is also suitable for the water jacket not to be arranged around the oil jacket, but to be arranged in portions where the oil jacket is not disposed in the exhaust pipe. It is also suitable for a water jacket not to be included in the exhaust pipe, and for the exhaust pipe to be cooled by an oil jacket only.

In the fourth preferred embodiment described above, the oil jacket 37 is preferably arranged in portions of the exhaust pipe 4. However, it is also suitable for the oil jacket 37 to be more expansive. For example, it is suitable for the oil jacket 37 to be provided in the entirety of the exhaust pipe 4. It is suitable for the oil jacket 37 to be provided in a more limited extent in the exhaust pipe 4. For example, it is suitable for the oil jacket 37 to be provided in the exhaust manifold 41 only.

In the first preferred embodiment described above, the oil jacket 84 is preferably provided in the entirety of the exhaust pipe 74. However, it is also suitable for the oil jacket 84 to be provided in a more limited extent. For example, it is suitable for the oil jacket 84 to be provided around the catalyst 80 in the exhaust pipe 74 or only upstream from the catalyst 80.

Provision or otherwise of a water jacket, the downstream end location of the oil jacket, the direction of flow of lubricating oil in the oil jacket, and the direction of flow of cooling water in the water jacket and the like, are not limited by descriptions thereof in the above-described preferred embodiments of the present invention, but may be modified and varied to further adjust the temperature inside the exhaust pipe as suitable.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An engine comprising:
   an engine body including a combustion chamber and an oil passage in which lubricating oil flows; and
   an exhaust pipe including an exhaust gas passage linked to the combustion chamber and an oil jacket linked to the oil passage; wherein
   the exhaust pipe includes an outer pipe and an inner pipe arranged such that exhaust gas directly contacts an inner surface of the inner pipe; and
   the oil jacket is disposed between and defined by the outer pipe and the inner pipe such that the lubricating oil directly contacts an outer surface of the inner pipe.

2. The engine according to claim 1, wherein the oil jacket is arranged around at least a portion of the exhaust gas passage.

3. The engine according to claim 1, wherein the exhaust pipe further includes a water jacket arranged around at least a portion of the oil jacket.

4. The engine according to claim 1, further comprising:
   a catalyst arranged in the exhaust gas passage; wherein
   the oil jacket is arranged around the exhaust gas passage in at least a location upstream from the catalyst.

5. The engine according to claim 1, further comprising:
   a catalyst arranged in the exhaust gas passage; wherein
   the oil jacket is arranged around the exhaust gas passage in at least a location where the catalyst is arranged.

6. The engine according to claim 1, further comprising:
   an oxygen sensor arranged in the exhaust gas passage; wherein
   the oil jacket is arranged around the exhaust gas passage in at least a location upstream from the oxygen sensor.

7. The engine according to claim 1, further comprising:
   an oxygen sensor arranged in the exhaust gas passage; wherein
   the oil jacket is arranged around the exhaust gas passage in at least a portion where the oxygen sensor is located.

8. The engine according to claim 1, further comprising:
   an oil pan arranged to collect the lubricating oil;
   an oil circulation passage in which the lubricating oil delivered to the oil passage from the oil pan flows;
   an oil cooler arranged to cool the lubricating oil that flows in the oil circulation passage; and
   an oil branch passage connecting an upstream end of the oil jacket and a portion of the oil circulation passage upstream of the oil cooler.

9. The engine according to claim 1, further comprising:
   an oil pan arranged to collect the lubricating oil;
   an oil circulation passage in which the lubricating oil delivered to the oil passage from the oil pan flows;
   an oil cooler arranged to cool the lubricating oil that flows in the oil circulation passage; and
   an oil branch passage connecting an upstream end of the oil jacket and a portion of the oil circulation passage downstream of the oil cooler.

10. The engine according to claim 1, further comprising:
    an oil pan arranged to collect the lubricating oil;
    an oil circulation passage in which the lubricating oil delivered to the oil passage from the oil pan flows;
    an oil filter that filters the lubricating oil that flows in the oil circulation passage; and
    an oil branch passage connecting an upstream end of the oil jacket and a portion of the oil circulation passage upstream of the oil filter.

11. The engine according to claim 1, further comprising:
    an oil pan arranged to collect the lubricating oil;
    an oil circulation passage in which the lubricating oil delivered to the oil passage from the oil pan flows; and
    an oil branch passage connecting an upstream end of the oil jacket and the oil circulation passage.

12. The engine according to claim 11, further comprising:
    an oil return passage connecting a downstream end of the oil jacket and a portion of the oil circulation passage downstream of the oil branch passage.

13. The engine according to claim 11, further comprising:
    an oil return passage connecting a downstream end of the oil jacket and the oil pan.

* * * * *